Feb. 27, 1940.    C. S. ASH    2,192,023
DUAL WHEEL VEHICLE BRAKE
Filed July 29, 1938    3 Sheets-Sheet 2
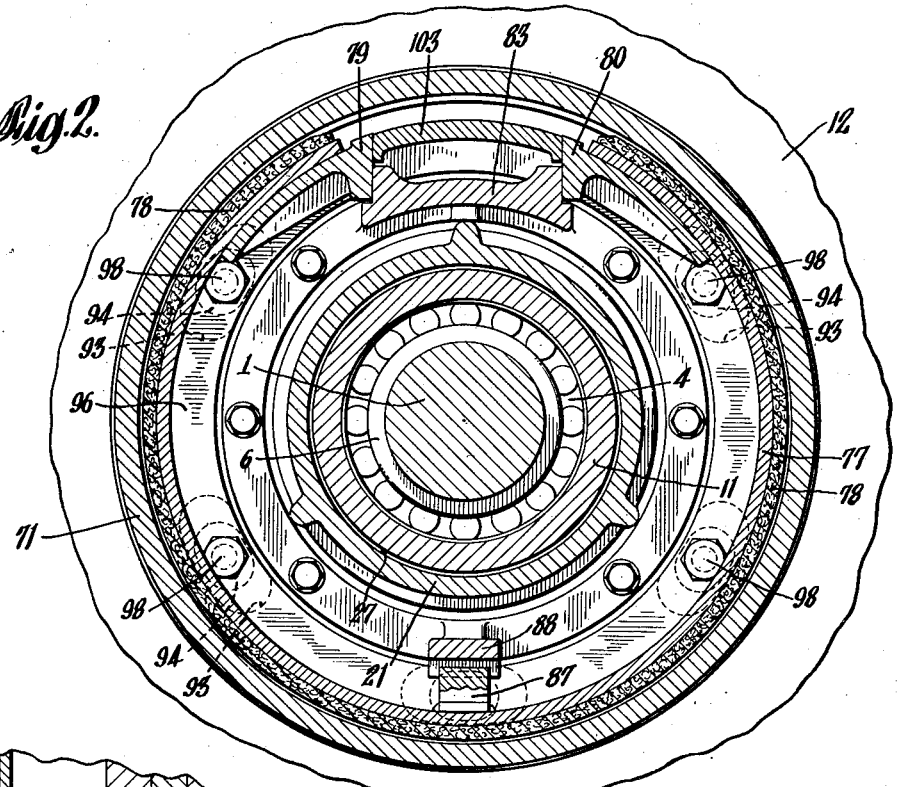
INVENTOR
Charles S. Ash
BY
Morgan, Finnegan and Windham
ATTORNEYS

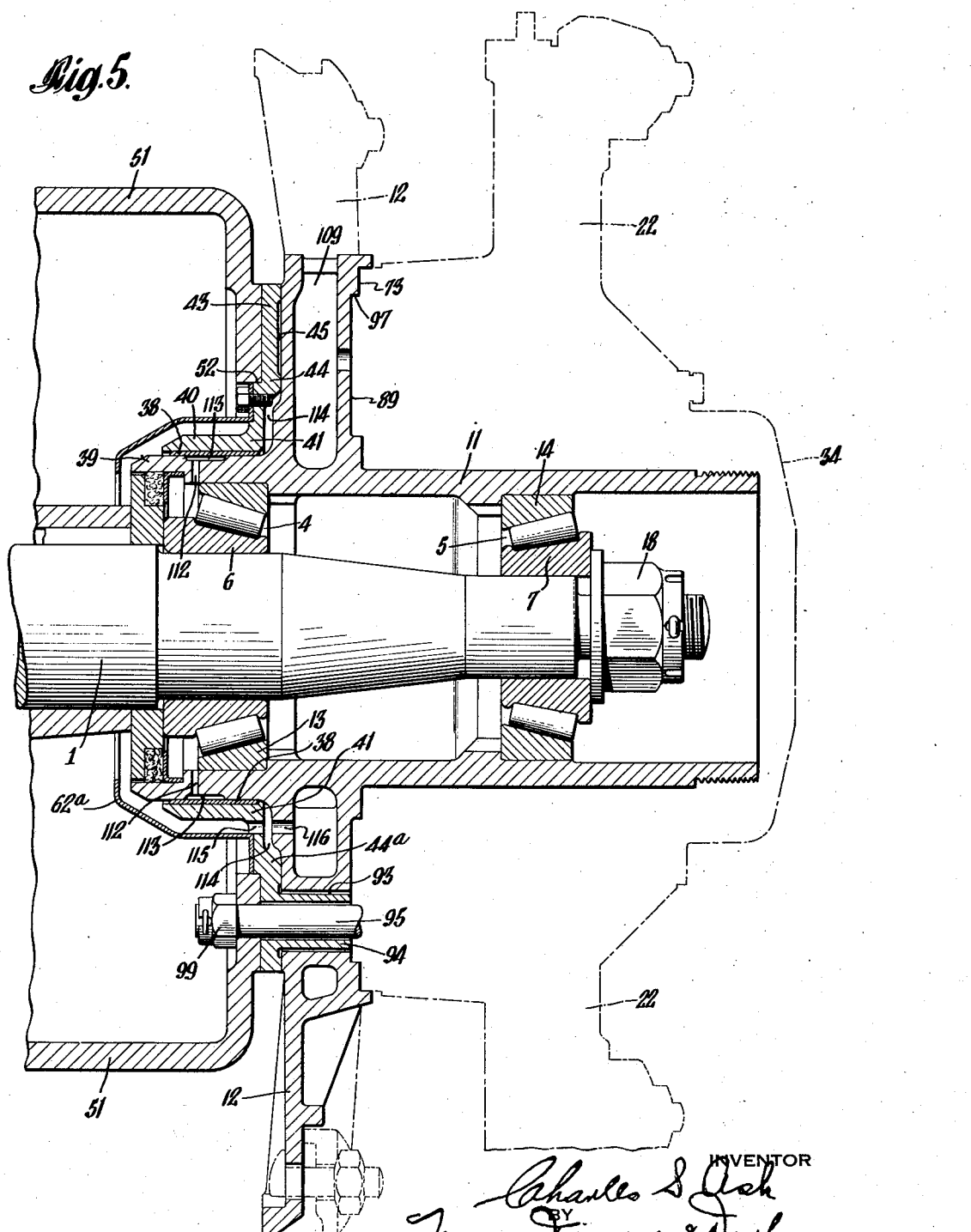

Patented Feb. 27, 1940

2,192,023

UNITED STATES PATENT OFFICE 2,192,023

DUAL WHEEL VEHICLE BRAKE

Charles S. Ash, Milford, Mich.

Application July 29, 1938, Serial No. 221,869

12 Claims. (Cl. 188—18)

The invention relates to new and useful improvements in vehicular dual wheel structures and more particularly to improvements in the mountings of the dual wheels on the axles for independent rotation and in the means for exerting uniform braking action on the wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a section taken on line 2—2 of Fig. 1;

Fig. 3 is a detached plan view showing the clutch actuating finger and its supporting annulus;

Fig. 4 is an enlarged section on line 4—4 of Fig. 1; and

Fig. 5 is a transverse section, similar to Fig. 1 and showing a somewhat different lubricating system.

Figure 1:
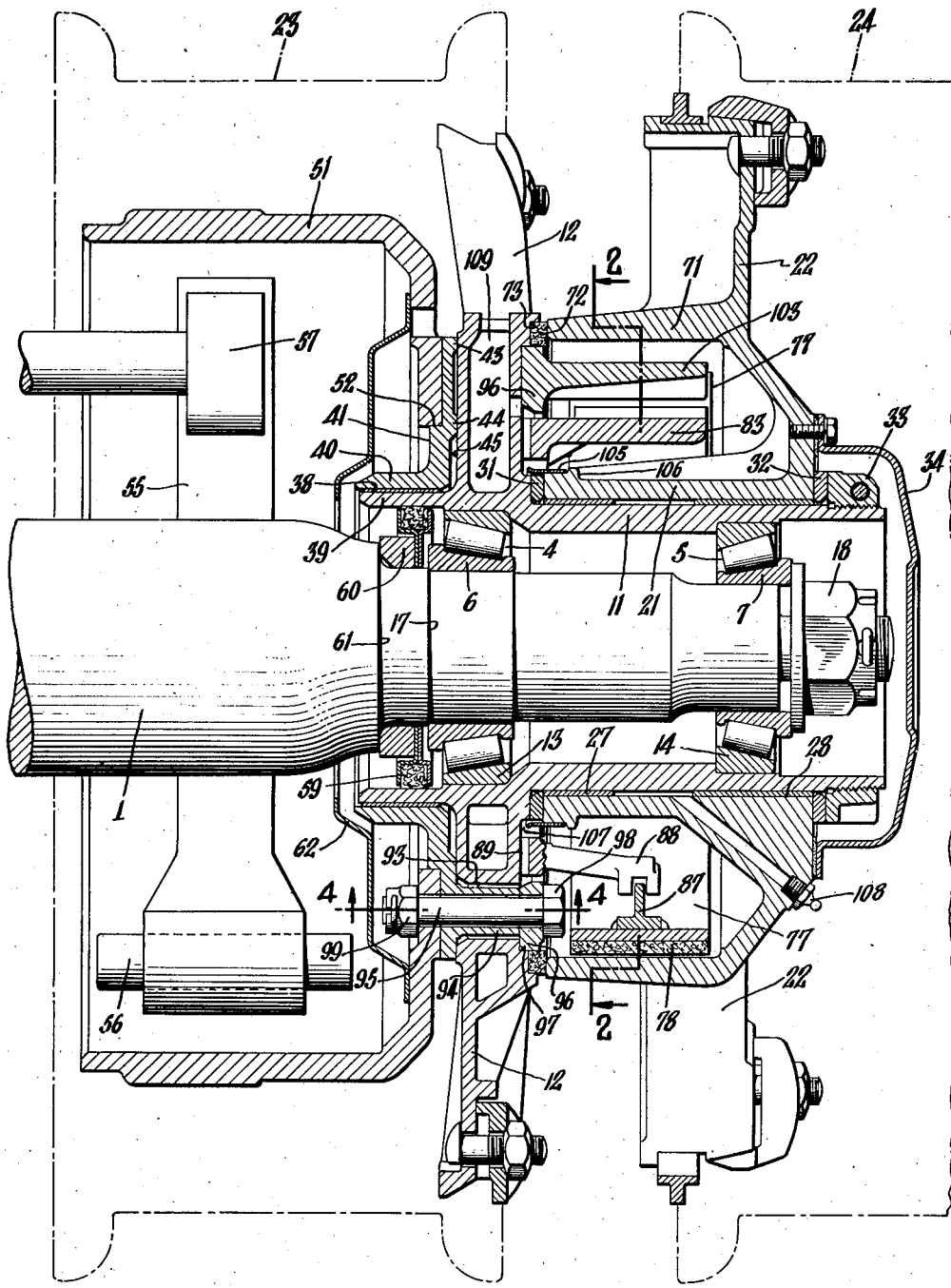
Fig. 1 is a transverse section of an exemplary dual wheel assembly.

Objects of the invention are to provide a novel wheel assembly of relatively simple and powerful construction, having ample bearings for independently rotatable side-by-side wheels, capacitated to transport heavy loads over practically all kinds of roads, while at the same time imposing minimum wear upon the tires and minimum strains upon the wheels; to provide simple, reliable and efficient braking means under the control of the driver and acting automatically to clutch or lock the wheels together when braking pressure is applied, so as to exert uniform braking action on the wheels, and thereby avoid surface drag upon and resultant unnecessary wear of the tires; to provide simple and efficient lubrication for the entire mechanism, preferably from a single source, and to provide lubrication for all sliding and contacting parts so as to avoid the dangers and disadvantages of dry bearings, either in the wheel assembly itself or in the braking and clutching mechanism. In the present illustrative embodiment the wheel assembly is shown mounted upon a rigid axle, although a variable camber axle mounting, such as a bearing-carrying skein pivoted horizontally to the axle, may be employed, also ample bearings capable of sustaining long protracted and heavy road and load duty are provided, and in this embodiment, this has been effected in compact form by journalling one wheel on the hub of the other. The automatic clutching of the wheels during application of braking pressure is effected by creating relative movement of the driver-operated braking mechanism and its wheel to actuate the clutching mechanism to effect the desired concurrent and uniform braking action on both wheels so as to avoid scraping, dragging and unnecessary wear of the tires. Other features and objects will appear from the following description, and it will be understood that the foregoing general description, and the appended detail description as well, are exemplary and explanatory of the invention but are not restrictive thereof.

Referring now by way of example to the embodiment of the invention illustrated by way of example in the accompanying drawings, a vehicle axle 1 is shown on which the dual wheel assembly and the cooperating braking mechanisms are mounted. A pair of radial-thrust roller bearings 4 and 5 are shown, with their inner race rings 6 and 7 mounted on the axle, the hub 11 of the inner wheel 12 being mounted on the outer race rings 13 and 14 of said bearings. The race ring 6 abuts on a shoulder 17 formed on the axle 1, and the race ring 7 is held in place by a locking nut 18, screw-threaded onto the end of the axle. The outer race rings 13 and 14 of said bearings abut on suitable annular shoulders formed on the inside of the hub 11. The hub 11 of the inner wheel 12 is relatively long, and serves as a broad bearing on which the hub 21 of the outer wheel 22 is rotatively mounted. The wheels 12 and 22 are provided with suitable rims 23 and 24, upon which the tires are mounted. The inwardly-extending hub 21 of the outer wheel 22 is likewise of elongated form so as to furnish a broad bearing for the outer wheel. Suitable bushing rings 27 and 28 are interposed in the bearing between the hub 11 of the inner wheel 12 and the hub 21 of the outer wheel 22. The inner face of the hub 21 abuts on a floating thrust washer 31 which in turn abuts onto a shouldered face of the inner wheel. A like floating thrust washer 32 abuts on the exterior face of the hub 21, and a locking nut 33 is screw-threaded onto the exterior end of the hub 11 of the inner wheel, to retain the outer wheel on its bearing. The side-by-side dual wheels are thus mounted for independent rotation, with ample bearings capable of standing up under protracted heavy duty. A cap 34 is bolted onto the outer face of the hub of the outer wheel 22, to enclose and protect the ends of the axle and the hubs.

Means are provided whereby braking pressure may be applied through a single braking mechanism, and to one of the independently rotating wheels, and on application of the braking or retarding action, the mechanism acts automatically to clutch the wheels together, so that the braking action is applied uniformly to both wheels. As here embodied, the inner wheel 12 has a tubular hub portion 39 extending inwardly from the web of the wheel, and spaced apart from the axle 1. Mounted exteriorly on the hub extension 39 is the inwardly extending hub 40 of a flat circular brake drum support or adapter 41, with an interposed bushing 38, the flat member 41 having on its exterior face bearing rings 43 and 44, which bear against a flat inner surface 45 of the web of the wheel 12. Thus the brake drum support 41 is rotatively mounted on the hub member 39 of wheel 12, and has limited angular movement, as later described, the flat circular plate portion of the support 41 being slidable upon the inner face 45 of the wheel 12. A brake drum 51, which may be of some standard or other similar form is mounted on support 41, and as shown has in its flat outer end a circular concentric opening, which fits onto an annular shoulder 52, formed on the inner side of the support or adapter 41. Any suitable form of brake pressure supplying means may be provided, and is shown conventionally as of the inner double shoe expanding type, the shoe 55 being pivotally supported at 56 and acted on by the expander 57 which is operated from any suitable brake control mechanism. Within the tubular inner hub 39 of wheel 12 there is provided an oil seal 59, and a spacing ring 60, which abuts on a shoulder 61 formed on the axle. A dished, centrally apertured lubricant catcher 62 is fixed to the inner flat end of the drum 51 and is located within but spaced from the inner end of the bearing. This device catches any excess lubricant escaping from the inner end of the wheel hub. This lubricant is carried outwardly and escapes through openings in the flat face of the brake drum, and thus is prevented from getting into the brakes.

Referring now to the embodied form of means for automatically clutching the two wheels together to effect concurrent and uniform braking, there is formed on the inner face of the outer wheel 22 an inwardly-extending drum 71, the outer circular rim thereof abutting on the web of the inner wheel 12, an oil seal 72 being interposed between the outer annular face of the drum and an annular shouldered part 73 formed on the outer face of the web of wheel 12. Within the drum 71 is nested a clutching and declutching member comprising an annular and circumferentially interrupted or split shoe 77, said shoe having an outer layer 78 of brake lining or like suitable material. Fixed to the two ends of the annular or arcuate shoe 77 are two thrust pieces 79 and 80, and projecting outwardly from the outer face of the web of the inner wheel 12 is a stop lug 83, which fills the space between the thrust pieces 79 and 80, and serves to hold the shoe 77 in position within the drum 71, and normally in declutching position. Diametrically opposite the mechanism just described devices are provided for keeping the shoe 77 in position while leaving it free to effect the clutching and declutching movement and as shown an inwardly extending flat lug 87 is fixed on the inner face of the shoe 77. A bifurcated bracket 88 fits over the lug, the base of the bracket being fixed at 89 to the exterior face of the web of the wheel 12.

Means are provided, operated automatically from the driver controlled brake mechanism, for expanding the shoe 77 to clutch the drum 71 whenever braking pressure is applied on the brake drum 51 of the inner wheel. To this end the drum 51 and its support 41 have limited arcuate relative movement upon its supporting hub member 39 and with respect to the wheel 12, in order to effect the clutching and declutching action of the shoe 77 with the drum 71 of the outer wheel. As embodied, there are a plurality of arcuate slots 93 in spaced-apart relation in the web of the inner wheel 12. On the outer face of the supporting member 41 of the brake drum 51 are integral, spaced-apart, outwardly-extending spacing bosses 94 extending through the corresponding arcuate slots 93. The bosses 94 are longitudinally apertured, and bolts 95 pass through openings in the flat end of the brake drum 51, through the apertured bosses 94, and through openings in an apertured annular plate 96, which plate abuts on the flat outer face of the web of the wheel 12 and is nested within an annular shoulder 97 formed in the wheel web. The heads 98 of the bolts 95 abut on the outer side of the annular plate 96 and nuts 99 are screw threaded onto the bolts on the inner side of the flat plate of the brake drum 57. Thus the brake drum 51 and its support 41 on the inner side of the wheel 12 and the annular plate 96 on the outer side of the wheel 12 are held together by bolts 95, and are mounted for limited arcuate movement together relatively to the wheel 12. Fixed to and extending outwardly from the outer face of the annular plate 96 is a clutch actuating plate or finger 103, which extends into and occupies the gap between the thrust pieces 79 and 80, which are fixed to the ends of the clutch shoe 77. Whenever the brake is applied to cause the shoes 55 to engage the brake drum 51, the drum is retarded and there is relative movement of the drum 51 and annular plate 96 with respect to the wheel 12. Thereby the actuator plate or finger 103 is moved relatively to the positioning stop 83 (which is fixed to the wheel 12). Thus one end of shoe 77 is moved circumferentially away from stop 83, and thereby the shoe is expanded to engage and clutch drum 71 and the braking pressure is thus applied concurrently to both wheels. In accordance with one feature of the invention, the contacting surfaces of the thrust pieces 79 and 80, the stop 83 and the clutch-actuating finger 103 are mutually angled to effect highly efficient clutching action. To this end all these engaging surfaces are outwardly convergingly inclined, and preferably the faces of the clutch band ends are parallel to the central radial line of the device. Thus when the clutching action is applied there is expansion of the shoe 77 due to the angular relative movement of stop 83 and finger 103, and by reason of said inclination of all the contacting surfaces, there is an additional outward radial thrust of the shoe 77.

Means are provided for effecting adequate lubrication of the braking and clutching devices from the general lubricating means for the wheel assembly. As embodied, a flaring sheet-like ring 105 is mounted against an annular shoulder 106 on the exterior of the hub 21 of the outer wheel, the flaring end extending toward the web of the inner wheel. Adjacent the edge of the ring 105 are a plurality of radially-disposed, outwardly-extending passages 107, formed in members 83 and 88, which terminate just within the annular plate 96. Thus lubricant supplied to the hub bearings of the wheels and flowing away therefrom is directed by the annular plate 105 into the passages 107, and is directed onto the bearing surfaces between the plate 96 and the wheel web and over the outer face of the inner wheel, and is caught by the inwardly beveled inner diameter of the part 103, and carried through openings in the inner wheel and finally escapes through apertures 109. The axle and hub construction provides for maintaining a large main body of lubricant in contact with the axle and wheel bearings and within the cap 34 which effectutally lubricates these bearings and also lubricates the brake and clutch mechanisms as described. Inter-hub lubrication may be supplied, if desired, by suitable pressure means 108 which may be of any standard or convenient form. The waste or excess lubricant can drain off through openings 109.

In Fig. 5 an economical and highly efficient lubrication means is shown designed to effect adequate lubrication of practically all bearing surfaces from the main lubrication chamber for the wheel bearings. Excess or spare lubricant is conveyed from the chamber through openings 112 and space 113 onto and about the bushing 38 and thence into the annular space 114, which acts as a reservoir. The annular reservoir space 114 is formed between the back plate of the adapter 41, which is shouldered annularly outwordly at 44a, the annular outer part being in sliding contact with the wheel. Lubricant also enters the reservoir through openings 115. From here the oil can lubricate the surfaces between the inner face of wheel 12 and the flat rear surface of the brake drum adapter 41 and associated parts. Excess lubricant also passes through the openings 116 and finally passes out through the openings 109 in the wheel web. This device also lubricates the outer surfaces of the inner wheel in the same manner as the lubricating means shown in Fig. 1 and previously described. The lubricant catcher 62a is shaped to fit in a space away but fairly close relation about the inner end of the bearing and of the end oil seal, and curves inwardly to a juncture with the adapter just outside the oil drainage orifices 115 so as to direct the caught lubricant thereinto. This mechanism provides a very complete lubrication for all contacting and sliding surfaces by the excess lubricant from the main bearing.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel structure for vehicles including in combination an inner wheel to be rotatively mounted on an axle, an outer wheel thereon mounted to rotate independently, a drum on the inner side of said outer wheel, a circumferentially interrupted annular expansible shoe within said drum, a stop fixed to said inner wheel and extending between the ends of said interrupted shoe to prevent circular movement thereof, a brake drum mounted on the inside of said inner wheel to have limited angular movement relatively to the wheel, a shoe within said last-mentioned brake drum and means for causing the shoe to exert braking pressure on the drum, means mounted on the inner wheel and connected to said inner brake drum to have angular movement therewith, including a member extending into the gap in said interrupted shoe of said outer drum and acting to expand the shoe to lock the inner and outer wheels together when the braking pressure is applied on said inner brake drum.

2. A dual wheel structure for vehicles including in combination an inner wheel to be rotatively mounted on an axle, an outer wheel rotatively mounted on the hub of the inner wheel, a drum on the inner side of said outer wheel, a circumferentially interrupted annular expansible shoe within said drum, a stop fixed to said inner wheel and extending between the ends of said interrupted shoe to prevent circular movement thereof, a brake drum mounted on the inside of said inner wheel to have limited angular movement relatively to the wheel, a shoe within said last-mentioned brake drum and means for causing the shoe to exert braking pressure on the drum, means mounted on the inner wheel and connected to said inner brake drum to have angular movement therewith, including a member extending into the gap in said interrupted shoe of said outer drum and acting to expand the shoe to lock the inner and outer wheels together when the braking pressure is applied on said inner brake drum.

3. A dual wheel structure for vehicles including in combination an inner wheel to be rotatively mounted on an axle, an outer wheel mounted to rotate independently, a drum on the inner side of said outer wheel, a circumferentially interrupted annular expansible shoe within said drum, a stop fixed to said inner wheel and extending between the ends of said interrupted shoe to prevent circular movement thereof, a brake drum mounted on the inside of said inner wheel to have limited angular movement relatively to the wheel, a shoe within said last-mentioned brake drum and means for causing the shoe to exert braking pressure on the drum, an annular plate mounted on the outer side of the inner wheel and connected to said inner brake drum to have angular movement therewith, a member fixed to said ring and extending into the gap in said interrupted shoe of said outer drum and acting to expand the shoe to lock the inner and outer wheels together when the braking pressure is applied on said inner brake drum.

4. A dual wheel structure for vehicles including in combination an inner wheel to be rotatively mounted on an axle and having an elongated hub, an outer wheel rotatively mounted on the hub of the inner wheel, a drum on the inner side of said outer wheel, a circumferentially interrupted annular expansible shoe within said drum, a stop fixed to said inner wheel and extending between the ends of said interrupted shoe to prevent circular movement thereof, a brake drum mounted on the inside of said inner wheel to have limited angular movement relatively to the wheel, a shoe within said last-mentioned brake drum and means for causing the shoe to exert braking pressure on the drum, an annular plate mounted on the outer side of the inner wheel and connected to said inner brake drum to have angular movement therewith, a member fixed to said ring and extending into the gap in said interrupted shoe of said outer drum and acting to expand the shoe to lock the inner and outer wheels together when the braking pressure is applied on said inner brake drum.

5. In a brake mechanism for dual, normally independently rotatable wheels, a brake drum mounted on one of the wheels, driver operated means for applying braking pressure to the drum, there being a plurality of arcuate slots in the wheel web, and a plurality of bosses extending from the rear of said drum through said slots, an annular plate fixed to said bosses on the opposite side of the wheel from said drum, a drum fixed to the other wheel, a shoe within said drum, and connections from said annular plate to said last-mentioned drum and shoe for clutching the drum and shoe together and causing them to move with the first-mentioned wheel.

6. In a brake mechanism for dual, normally independently rotatable wheels, a drum fixed to one of said wheels, an annular interrupted shoe within said drum, a stop fixed to said wheel and projecting into the gap in the shoe to prevent angular movement of the shoe relatively to said wheel and drum, driver operated braking means mounted on the other wheel, and a finger connected to said braking means and extending into the gap in said annular shoe and acting when braking pressure is applied to expand the shoe to clutch the drum.

7. In a brake mechanism for dual wheels a drum fixed to one of said wheels, an interrupted annular shoe within the drum, thrust pieces fixed to the ends of said shoe and having outwardly converging inclined contact faces, a stop fixed to another wheel and interposed between said thrust pieces and having outwardly converging inclined faces contacting with the like faces on the thrust pieces, and a finger connected to the other wheel and interposed between the thrust pieces and having outwardly converging inclined faces engaging the like faces on said thrust pieces and being relatively movable to expand said shoe to grip the shoe and drum together.

8. A dual wheel structure for vehicles including in combination an inner wheel to be rotatively mounted on an axle, an outer wheel thereon mounted to rotate independently, driver operated braking means mounted on one of said wheels and including parts in contact with and movable relatively to the wheel, connections between said braking means and the other wheel for clutching the wheels together when the brake is applied, said connections including contacting relatively movable parts, means for maintaining a body of lubricant in contact with the wheel bearings on the axle shaft, means for conveying lubricant from said main body to said contacting and relatively movable surfaces and means for deflecting the conveyed lubricant away from the contacting parts of the braking and clutching means.

9. A dual wheel structure for vehicles including in combination an inner wheel to be rotatively mounted on an axle, an outer wheel thereon mounted to rotate independently, braking means mounted on one of said wheels, clutch means between said wheels for clutching the wheels together when the brake is applied and including relatively movable parts on the inner wheel, means for maintaining a body of lubricant in contact with the wheel bearings on the axle shaft, means for conveying lubricant from said main body to said contacting and relatively movable surfaces and means for deflecting the conveyed lubricant away from the contacting parts of the braking and clutching means.

10. A dual wheel structure for vehicles including in combination an inner wheel and an outer wheel to be relatively and independently rotatable on an axle, braking means for one of the wheels, a clutch for clutching the two wheels together and means including a member relatively rotatable on the braked wheel for actuating the clutch, means for maintaining a body of lubricant on the wheel bearings, an outlet passage for lubricant said passage including the contacting surfaces of the clutch actuating member and the wheel on which it is mounted and means for deflecting the conveyed lubricant away from the contacting parts of the braking and clutching means.

11. A dual wheel structure for vehicles including in combination an inner wheel and an outer wheel to be relatively and independently rotatable on an axle, braking means including a drum mounted on one of the wheels and having angular movement relatively to and in contact with the wheel, means for clutching the two wheels together including a member actuated by said drum and carried by said wheel and having sliding contact therewith on the opposite side of the wheel from the brake drum, means for maintaining a body of lubricant on the wheel bearings, an outlet passage for lubricant, said passage supplying the lubricant to the contacting surfaces between said drum and the wheel and between said clutch actuating member and the wheel and means for deflecting the conveyed lubricant away from the contacting parts of the braking and clutching means.

12. A dual wheel structure for vehicles including in combination an inner wheel and an outer wheel to be relatively and independently rotatable on an axle, braking means including a drum mounted on one of the wheels and having angular movement relatively to and in contact with the wheel, means for maintaining a body of lubricant on the wheel bearings, an outlet passage for lubricant, said passage supplying the lubricant to the contacting surfaces between said drum and the wheel and means for deflecting the conveyed lubricant away from the contacting parts of the braking and clutching means.

CHARLES S. ASH.